(12) United States Patent
Schrage

(10) Patent No.: US 9,213,625 B1
(45) Date of Patent: Dec. 15, 2015

(54) METHOD AND APPARATUS FOR PERFORMING AUTOMATED USER-INTERFACE LAYOUT TESTING

(75) Inventor: Andrew J. Schrage, San Mateo, CA (US)

(73) Assignee: INTUIT INC., Mountain View, CA (US)

( * ) Notice: Subject to any disclaimer, the term of this patent is extended or adjusted under 35 U.S.C. 154(b) by 500 days.

(21) Appl. No.: 12/844,284

(22) Filed: Jul. 27, 2010

(51) Int. Cl.
*G06F 3/048* (2013.01)
*G06F 11/36* (2006.01)

(52) U.S. Cl.
CPC ........ *G06F 11/3688* (2013.01); *G06F 11/3692* (2013.01)

(58) Field of Classification Search
CPC ......... G06F 9/44; G06F 3/00; G06F 11/3688; G06F 11/3692
USPC .......................................... 715/762; 717/124
See application file for complete search history.

(56) References Cited

U.S. PATENT DOCUMENTS

| | | | | |
|---|---|---|---|---|
| 5,475,843 A | * | 12/1995 | Halviatti et al. | 717/124 |
| 5,596,714 A | * | 1/1997 | Connell | 714/38.1 |
| 8,296,445 B1 | * | 10/2012 | Hackborn et al. | 709/228 |
| 2003/0065986 A1 | * | 4/2003 | Fraenkel et al. | 714/47 |
| 2005/0188357 A1 | * | 8/2005 | Derks et al. | 717/124 |
| 2006/0036958 A1 | * | 2/2006 | Dreher | 715/764 |
| 2006/0110047 A1 | * | 5/2006 | Reissman et al. | 382/218 |
| 2008/0294985 A1 | * | 11/2008 | Milov | 715/704 |
| 2009/0249297 A1 | * | 10/2009 | Doshi et al. | 717/124 |
| 2009/0297037 A1 | * | 12/2009 | Pele et al. | 382/209 |
| 2009/0320002 A1 | * | 12/2009 | Peri-Glass et al. | 717/131 |
| 2010/0027893 A1 | * | 2/2010 | Hayber | 382/218 |
| 2011/0289481 A1 | * | 11/2011 | Franklin et al. | 717/125 |

\* cited by examiner

*Primary Examiner* — Anil Bhargava
(74) *Attorney, Agent, or Firm* — Park, Vaughan, Fleming & Dowler LLP; Mark Spiller

(57) ABSTRACT

The disclosed embodiments provide a system that performs automated user-interface layout testing. During operation, the system executes a pre-defined set of operations for a program. After these operations have executed, the system then stores a representation (e.g., a snapshot) of the program user interface. The system then compares this representation against a validated representation that was previously stored for the pre-defined set of operations to determine a difference between the representations. This process facilitates detecting changes to the program (and/or the environment in which the program executes) that affect the user interface that is presented to a user.

16 Claims, 7 Drawing Sheets

METHOD AND APPARATUS FOR PERFORMING AUTOMATED USER-INTERFACE LAYOUT TESTING

BACKGROUND

1. Field of the Invention

The present invention relates to the testing of computer programs. More specifically, the present invention relates to a method and an apparatus that uses screen capture analysis to validate the layout of a computer program's user interface during development and testing.

2. Related Art

Developing software products typically involves substantial time and effort. In addition to the actual programming effort, the development process often involves ongoing quality assurance efforts that continue for the lifetime of a software product. For instance, validating the operation of a browser-based software application may involve testing a range of program features across a range of operating systems and browsers. Such testing typically needs to be repeated every time the program code or execution environment changes to ensure that the changes do not cause errors. Moreover, testing efforts typically include tests that check whether any changes negatively impact the user interface that the program presents to an end user.

Efforts to streamline the testing process often involve automating aspects of the testing process. For instance, some testing tools can automatically initiate a stream of user-interface operations that bring a program to a desired program state and then programmatically capture a screenshot of the program's user interface. A quality assurance tester can then visually inspect this screenshot to determine whether the current user-interface output matches the intended output. Unfortunately, while such automation capabilities reduce the amount of human effort needed, validating a complex user interface with a wide array of states and conditions still requires a tester to inspect a large number of screenshots and confirm that the user interface continues to function as intended.

Hence, what is needed are techniques for automating aspects of program testing without the above-described problems of existing techniques.

SUMMARY

The disclosed embodiments provide a system that performs automated user-interface layout testing. During operation, the system executes a pre-defined set of operations for a program. After these operations have executed, the system then stores a representation (e.g., a snapshot) of the program user interface. The system then compares this representation against a validated representation that was previously stored for the pre-defined set of operations to determine a difference between the representations. This process facilitates detecting changes to the program (and/or the environment in which the program executes) that affect the user interface that is presented to a user.

In some embodiments, the system determines whether a detected difference between the representations will be noticeable to a user.

In some embodiments, the system receives a specification that identifies a specific region of interest in the representation and the validated representation. In such embodiments, the system only compares the region of interest for the two representations (instead of the entire representation).

In some embodiments, the system performs a per-pixel comparison of the two representations to precisely determine any difference between the representations. In alternative embodiments, the system performs a more elaborate comparison that attempts to screen out minor differences. For instance, the system may receive a specification that describes an acceptable level of change between the representation and the validated representation, and then determine whether a detected difference exceeds this acceptable level of change. For example, the specification may specify that two representations should not be considered different unless: a minimum specified number of pixels differ between the two representations; at least a specified percentage of pixels differ between the two representations; and/or the changed pixels between the two representations exceed a specified pixel density.

In some embodiments, the system notifies a quality assurance tester upon determining a difference between a representation and its validated representation. As part of this notification, the system may: provide the representation and the validated representation to the quality assurance tester; highlight pixels in the representation that differ from pixels in the validated representation; tag the representation in a manner that allows the quality assurance tester (and/or a software developer) to uniquely identify and re-create the representation; and/or receive an indication from the quality assurance tester that indicates that the representation is visually substantially similar to the validated representation.

In some embodiments, the system is used to compare multiple representations associated with different program operations and/or functionality during program development testing. Such ongoing testing ensures that the user interface presented to the user remains consistent across changes to the program and the program's execution environment (e.g., changes to a version of a browser, operating system, environment variables, etc.).

DETAILED DESCRIPTION

Figure 1A:
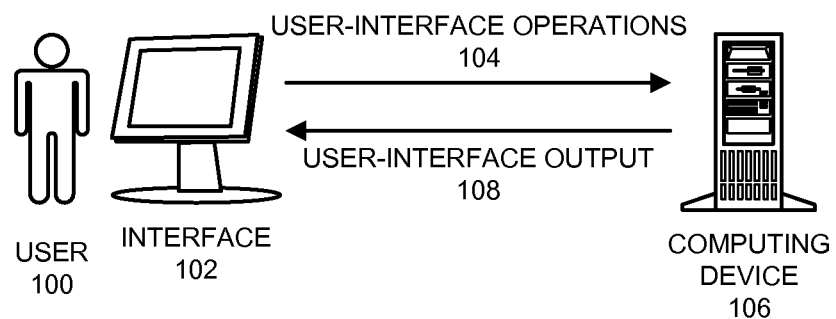
FIG. 1A illustrates an exemplary manual testing environment in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

User-Interface Layout Testing

As mentioned above, the software development process often includes ongoing testing and quality assurance efforts that continue for the lifetime of a software product (note that the terms software product, software application, application, and program are used interchangeably throughout this document). While test techniques that verify numerical calculations in test cases are fairly well known, validating on an ongoing basis that a user-interface layout looks and "feels" correct to a user is much more difficult. For instance, determining whether a number is displayed clearly on a web page in a manner that "looks right" (e.g., as opposed to having been shifted to a different location or split across multiple lines in a way that makes it difficult to read) typically requires direct evaluation by a person. Thus, user-interface layout testing often requires a human tester to manually interact with a program's user interface in an attempt to inspect all of the possible visuals output by the program. Unfortunately, this process is typically time-consuming and error-prone; the tester may miss a change, or may inadvertently not explore all aspects of the program's user interface. For example, for a browser-based, international financial software product, testing the user interface of the software product may involve executing a number of user-interface workflows using: a range of browser types; a range of host operating systems; and a range of currencies. Because of differences between Internet browsers, small program changes may cause unexpected negative impacts on the look and feel of an application in some browsers, but not in others. However, a wide range of program options and possible execution environments can lead to a large number of combinations that need to be tested to find and fix such issues. Ensuring that quality assurance (QA) personnel can test the application thoroughly and similarly across all of these possible scenarios, and over time and application changes, is a difficult task.

FIG. 1A illustrates an exemplary manual testing environment. A tester (e.g., user 100) uses interface 102 (e.g., a keyboard, a mouse, and a display that displays a user interface for a software application) to initiate user-interface operations 104 that are received by computing device 106. The software application acts upon these operations 104, and sends user-interface output 108 resulting from operations 104 to interface 102. As described above, QA personnel need to manually navigate through many aspects of an application (sometimes in multiple different execution environments) to ensure that the current user-interface output for the application is still "correct" (e.g., has not changed negatively), which can involve substantial manual effort.

Some testing tools are able to automatically initiate a stream of user-interface operations (e.g., navigate through a web page or application screen, click on a link or button, etc.) to bring a program to a desired program state. Such tools can sometimes also programmatically capture a screenshot of the program's user interface after performing the stream of operations. A QA tester can use such tools to automatically generate a screenshot for a desired program state, and then visually inspect this screenshot to determine whether the current user-interface output matches the intended output. While such automation capabilities can somewhat reduce the amount of human effort needed for testing, validating a program with a complex user interface that includes a wide array of states and conditions typically still requires a human tester to inspect a large number of screenshots to confirm that the user interface continues to function as intended following a change.

Embodiments of the present invention facilitate automating user-interface layout testing for programs. The described system combines the ability to automatically "drive through" (perform user-interface operations) a program, store representations of the user interface (e.g., capture and store screenshots), and then compare these stored screenshots with previously stored (and validated) screenshots to identify portions of the user interface that have changed.

Automated User-Interface Layout Testing

One embodiment of the present invention facilitates storing validated screenshots for a software product. A QA engineer writes an automated test that generates a screenshot, manually confirms that the user interface captured by this screenshot is valid, and then uploads this screenshot to a database of tracked screenshots. During subsequent testing sessions, the QA engineer initiates the automated test to perform the same set of user-interface operations and create a subsequent screenshot. The system then compares this most recent screenshot against the previously validated screenshot for the same workflow (and execution environment). If the system detects a difference between the screenshots, it can flag the automated test and/or notify the QA engineer.

Figure 1B:
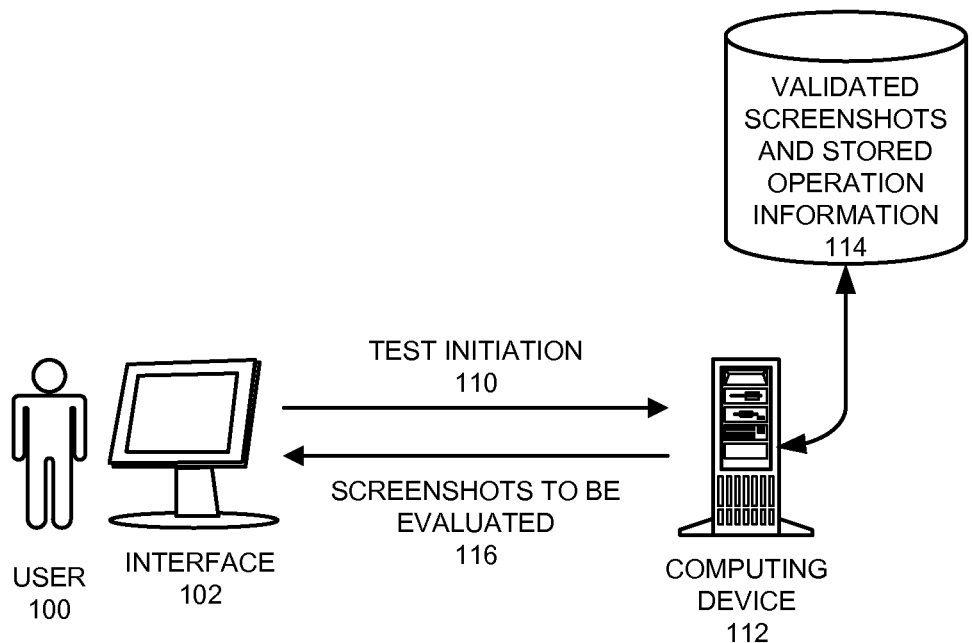
FIG. 1B illustrates an exemplary automated testing environment in accordance with an embodiment.

FIG. 1B illustrates an exemplary automated testing environment in which computing device 112 is able to store and/or access a set of validated screenshots and stored operation information 114 associated with a software application. A tester (e.g., user 100) uses interface 102 to initiate an automated test 110 for this software application. Upon receiving this test initiation request 110, computing device 112 automatically performs the user-interface operations associated with the automated test and generates a screenshot for the resulting user-interface output. Computing device 112 then finds a validated screenshot for the automated test, and compares the two screenshots to determine if they are different. If so, computing device 112 can flag the automated test and/or present both screenshots to user 100 for review.

Figure 2A:
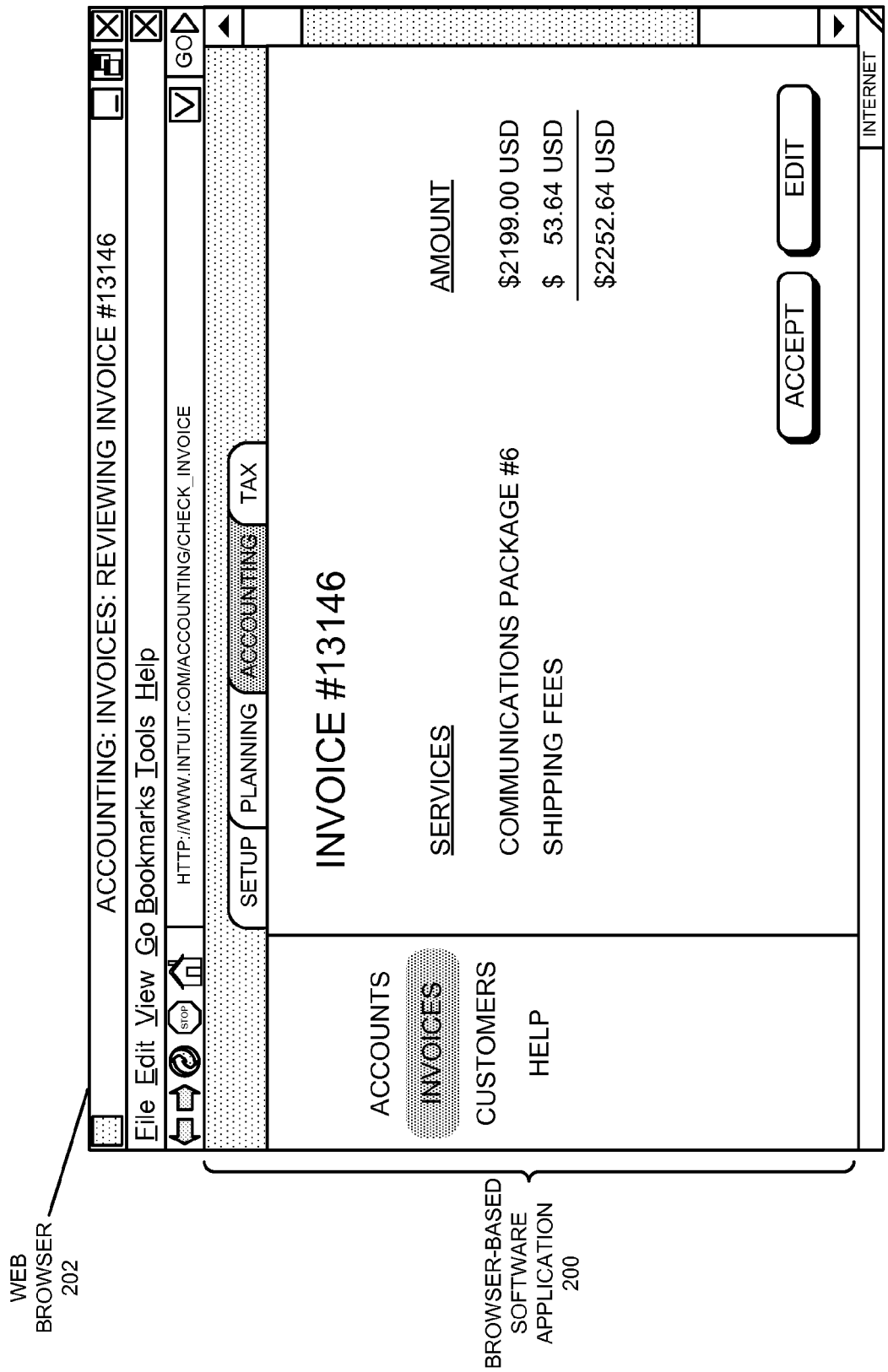
FIG. 2A illustrates an exemplary validated screenshot for the user interface of a browser-based software application in accordance with an embodiment.
Figure 2B:
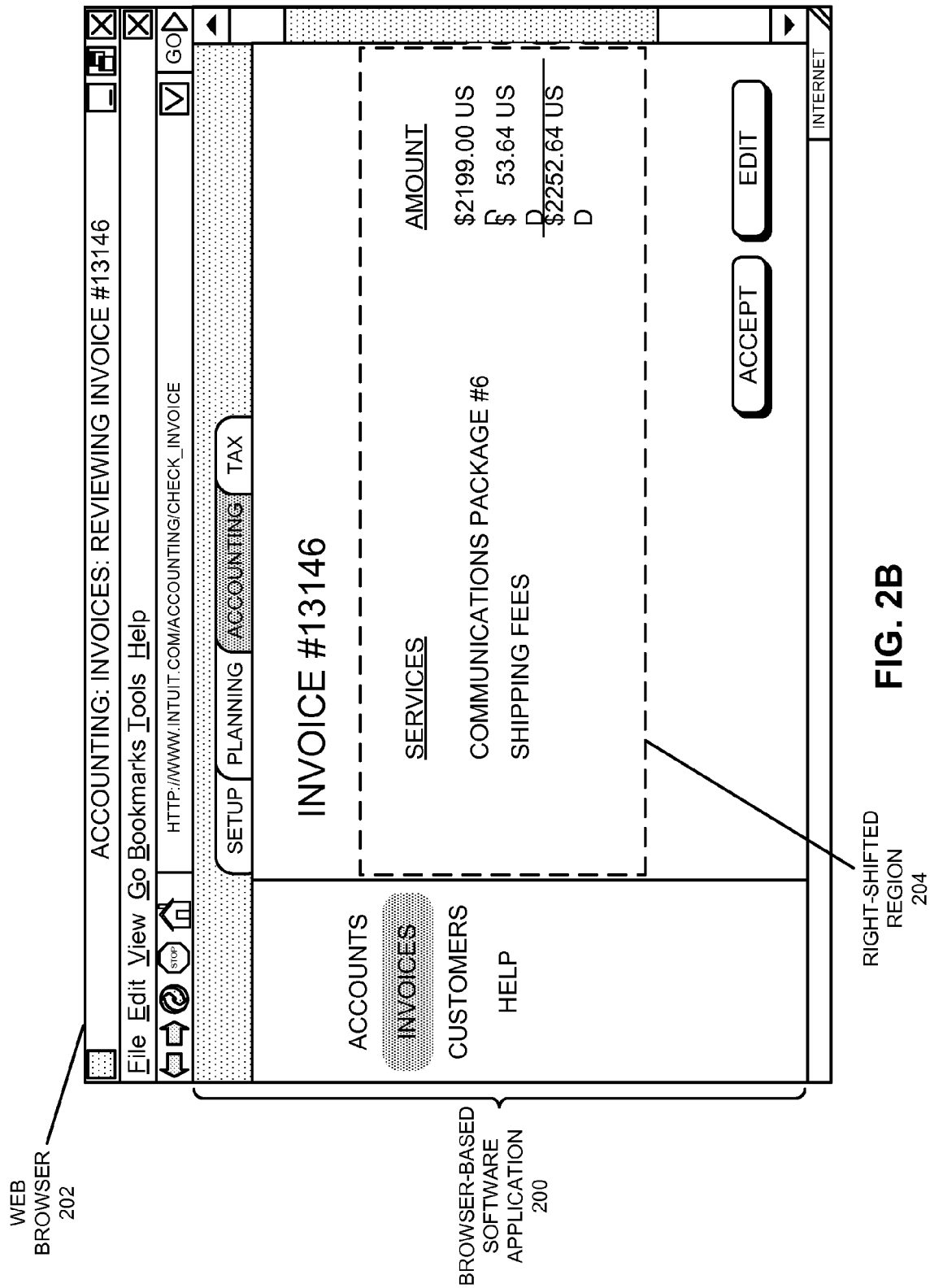
FIG. 2B illustrates a subsequent, erroneous screenshot for the same user interface of the browser-based software application illustrated in FIG. 2A in accordance with an embodiment.

FIGS. 2A-2B illustrate exemplary screenshots of the user interface of a browser-based software application. FIG. 2A illustrates an exemplary validated screenshot for a browser-based software application 200 that executes in a web browser 202. More specifically, the screenshot shown in FIG. 2A illustrates the output of an automated test that executes a workflow that presents specific invoice information (e.g., a list of services and a list of amounts billed) to a user. This image was previously reviewed by a QA engineer, and determined to be valid.

FIG. 2B illustrates a second screenshot (for the same automated test workflow as for FIG. 2A) that was captured subsequent to a change to the program code (or the execution environment) of software application 200. In FIG. 2B, portions of the displayed invoice information have been shifted to the right 204. As a result, characters in the amount column have wrapped around to a new line, resulting in an unattractive and potentially confusing user-interface output. By comparing the second screenshot with the validated screenshot, the system can determine that there have been changes to the displayed output, and can notify a QA engineer of the difference. For instance, the system may present the two screenshots to the QA engineer for inspection to allow the QA engineer to determine whether the two screenshots are equivalent or not. In this example, the QA engineer, upon reviewing the most recent screenshot, can confirm that there is indeed a problem in the displayed output, and escalate the issue appropriately. Note that the QA engineer does not need to look at every new screenshot, but instead only needs to review screenshots that are flagged as different from validated screenshots.

Figure 3:
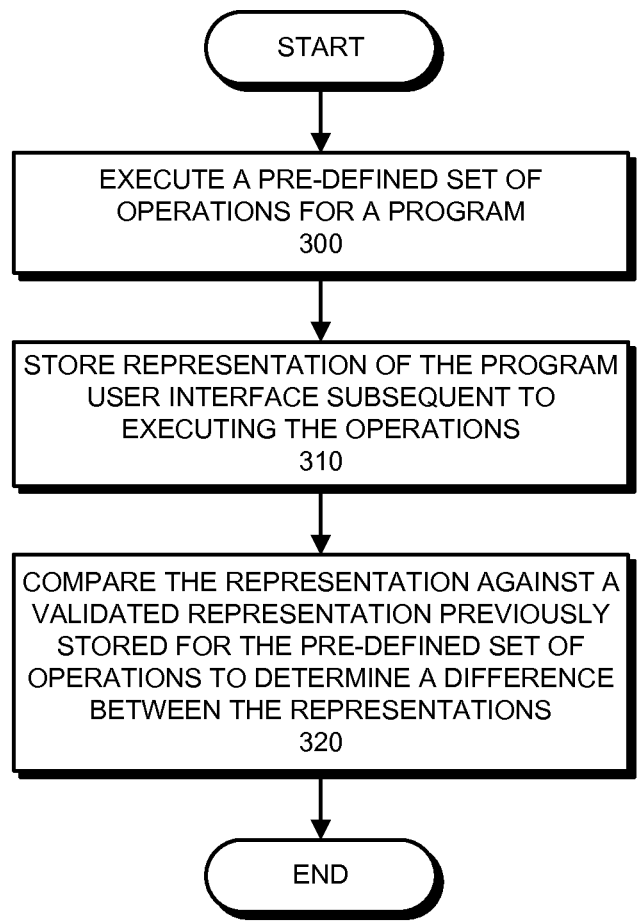
FIG. 3 presents a flow chart illustrating the process of performing automated user-interface layout testing in accordance with an embodiment.

FIG. 3 presents a flow chart that illustrates the process of performing automated user-interface layout testing. During operation, the system executes a pre-defined set of operations for a program (operation 300). After these operations have executed, the system then stores a representation (e.g., a snapshot) of the program user interface currently being displayed (operation 310). The system then compares this representation against a validated representation that was previously stored for the pre-defined set of operations to determine a difference between the representations (operation 320). This process facilitates detecting changes to the program (and/or the environment in which the program executes) that affect the user interface that is presented to a user.

In some embodiments, the system supports a range of techniques that facilitate determining different granularities of differences between two images. For instance, in one embodiment, the system may perform comparisons on a per-pixel basis and notify a QA engineer if even a single pixel has changed. Such detail-oriented techniques facilitate detecting subtle differences that may not be easily detectable by the human eye (e.g., if a displayed item has moved a few pixels to the side). In alternative embodiments, the system may be configured to ignore an acceptable level of change between a validated screenshot and a subsequent screenshot (e.g., to reduce the number of minor differences being flagged by test cases). For instance, the system may receive a specification that specifies that two representations should not be considered different unless: a minimum specified number of pixels differ between the two representations; at least a specified percentage of pixels differ between the two representations; and/or the changed pixels between the two representations exceed a specified pixel density. In such scenarios, the system may perform additional analysis to determine whether the difference between the two representations exceeds this acceptable level of change. In some embodiments, the system may also perform multiple comparisons between a subsequent screenshot and multiple previously validated screenshots to ensure that a successive set of small changes made over time do not collectively result in a large, visually negative change.

In some embodiments, the system includes an image storage system that automates the process of uploading and comparing images. This image storage system may include an application programmer interface (API) that allows QA engineers to easily access stored screenshots during automated user-interface tests. Additional application layers may be provided on top of this image storage system to allow users to browse, validate, and invalidate screenshots that are stored by the system during testing.

Note that screenshots may be saved in a range of image formats (e.g., compressed and/or uncompressed image formats) and indexed using a range of organizational techniques. For instance, for a set of financial software applications being tested, the system may group screenshots based on the specific software application, the given test workflow within the software application, the host operating system, the browser type and version, and/or the currency type being displayed. In some embodiments, the system may initially compare two compressed screenshots (e.g., two images stored using the JPG format) to determine whether they are different and then, upon detecting a difference, load (or generate) uncompressed screenshots that facilitate more detailed analysis of the two different user-interface states.

In some embodiments, screenshots are uniquely and automatically tagged in a manner that identifies the environment, workflow, and time frame in which their associated user-interface state was captured. For instance, the system can generate unique tags that allow multiple images of the same workflow to be easily identified for later comparison operations (e.g., "Create Invoice Estimate-Euro-Version1.37-Windows7-IE8"). Such tags facilitate automatically determining which screenshots should be compared, thereby sparing users from the burden of needing to find and select corresponding screenshot pairs.

In some embodiments, the system facilitates comparing only a subset of a given screenshot with a corresponding region of a validated screenshot. In some scenarios, a program's user interface may include additional text or graphics (e.g., menus, toolbars, etc.) that are not directly related to the aspects of the user-interface layout that are currently being tested. A QA engineer can manually or programmatically focus on a particular region of the screenshot that is of interest, thereby reducing the likelihood that changes in the surrounding user-interface regions will trigger a "false negative" (e.g., a difference between screenshots that is not directly related to the automated test being run) to be reported.

Figure 2C:
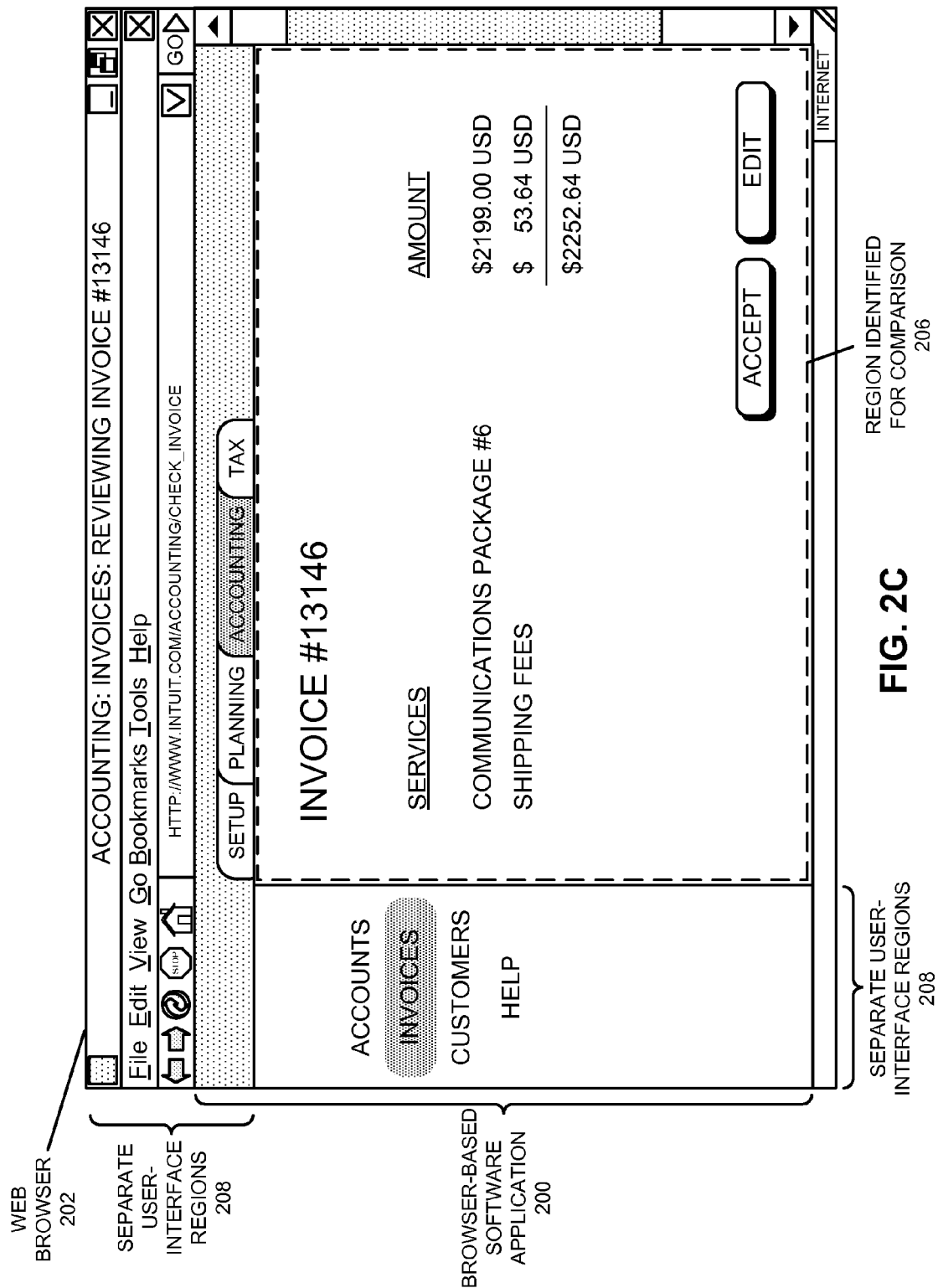
FIG. 2C illustrates an exemplary screenshot in which a specific sub-region has been identified for comparison in accordance with an embodiment.

FIG. 2C illustrates an exemplary screenshot (that corresponds to the exemplary screenshots of FIGS. 2A-2B) in which a specific sub-region 206 has been selected for comparison. Web browser 202 and browser-based software application 200 include a number of separate user-interface regions 208 that are independent from the invoice information being displayed in the region identified for comparison 206. For instance, higher-level application or environment changes may change the text displayed in a title bar, a tab bar, or a side menu. By specifying the specific area affected by the test case, a QA engineer can prevent false negatives from being flagged for situations where changes are external to the targeted area. Note that techniques that reduce the area being compared also facilitate reducing re-validation efforts when common user-interface elements are changed (e.g., a change to a menu name in a user interface might otherwise require all validated reference screenshots that include the original menu name to be manually re-generated and re-validated by QA engineers). The ability to limit comparisons to a specific region of interest generally facilitates more targeted, efficient, and useful automated layout testing.

In some embodiments, the described techniques can be applied to a range of software applications and execution environments. For instance, the described techniques can be applied to user-interface layouts in any type of software application, including (but not limited to) desktop software applications, mobile device environments, browser-based software applications, and/or operating systems. The described techniques may also be initiated manually or automatically (e.g., as periodic regression tests that execute every night or during every build of a software application). For instance, QA engineers may periodically invoke a large batch of such user-interface layout tests to identify user-interface changes that will be visible to customers, with the system only sending a return notification when one or more of such tests display results that are different from the validated set. Note that such automated layout testing can also be integrated into the software development process; developers and QA engineers can create automated tests for new features as these features are being developed, instead of at the end of the development process, when time is generally short and problems may take longer to debug and fix.

In some embodiments, the system may perform a range of additional operations upon detecting a difference between a screenshot and a corresponding validated screenshot. For instance, the system may be configured to send a QA team (or any human) an email that either includes the associated screenshots or provides a link to a tool that displays the associated screenshots side-by-side for easy comparison. The system may also create a customized screenshot that highlights the differences between the two screenshots, with indications of differences and/or overlaps. Based on this information, QA engineers can determine whether the difference between the new screenshot and the validated screenshot indicates a problem. If not, the new screenshot may be marked as being a new validated screenshot; otherwise, the new screenshot can be incorporated into a bug report (in which case the above-described tagging information can be used by a developer to reproduce the problem screenshot and pinpoint the problem), thereby simplifying the specification of user-interface layout errors to developers.

In summary, embodiments of the present invention involve techniques for performing automated user-interface layout testing using screen capture analysis. The described techniques facilitate determining whether program or execution environment negatively change an established user-interface layout. Such automated testing facilitates detecting changes and errors during program development and reduces the manual labor associated with finding layout errors, thereby saving time and money and allowing QA engineers to focus on other types of testing.

Computing Environment

In some embodiments of the present invention, techniques for performing automated user-interface layout testing can be incorporated into a wide range of computing devices in a computing environment.

Figure 4:
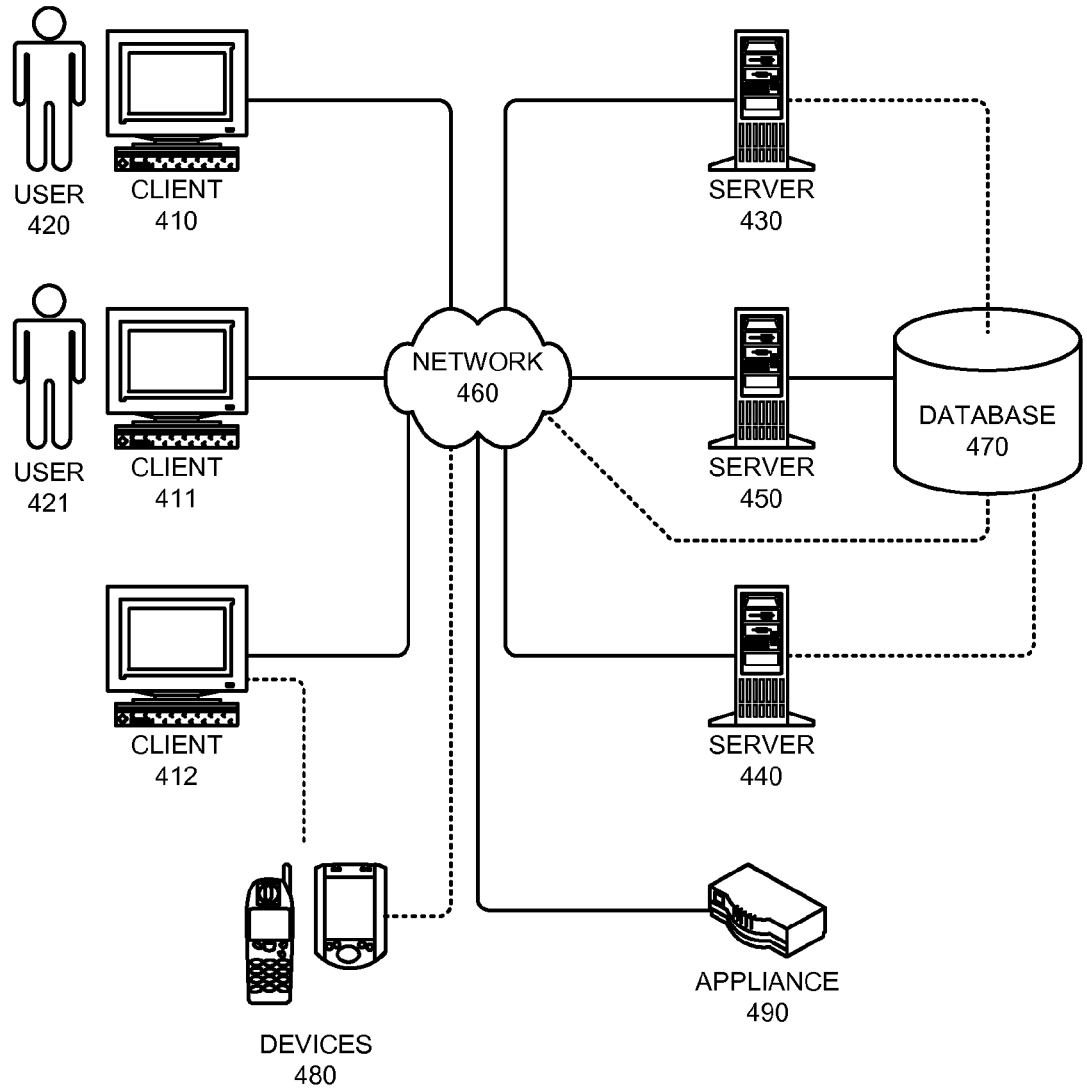
FIG. 4 illustrates a computing environment in accordance with an embodiment.

FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, and appliance 490.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. In some embodiments of the present invention, database 470 is used to store information related to diagnostic information and/or diagnostic formatters. Alternatively, other entities in computing environment 400 may also store such data (e.g., servers 430-450).

Devices 480 can include any type of electronic device that can be coupled to a client, such as client 412. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Note that different embodiments of the present invention may use different system configurations, and are not limited to the system configuration illustrated in computing environment 400. In general, any device that is capable of performing automated user-interface layout testing may incorporate elements of the present invention.

Figure 5:
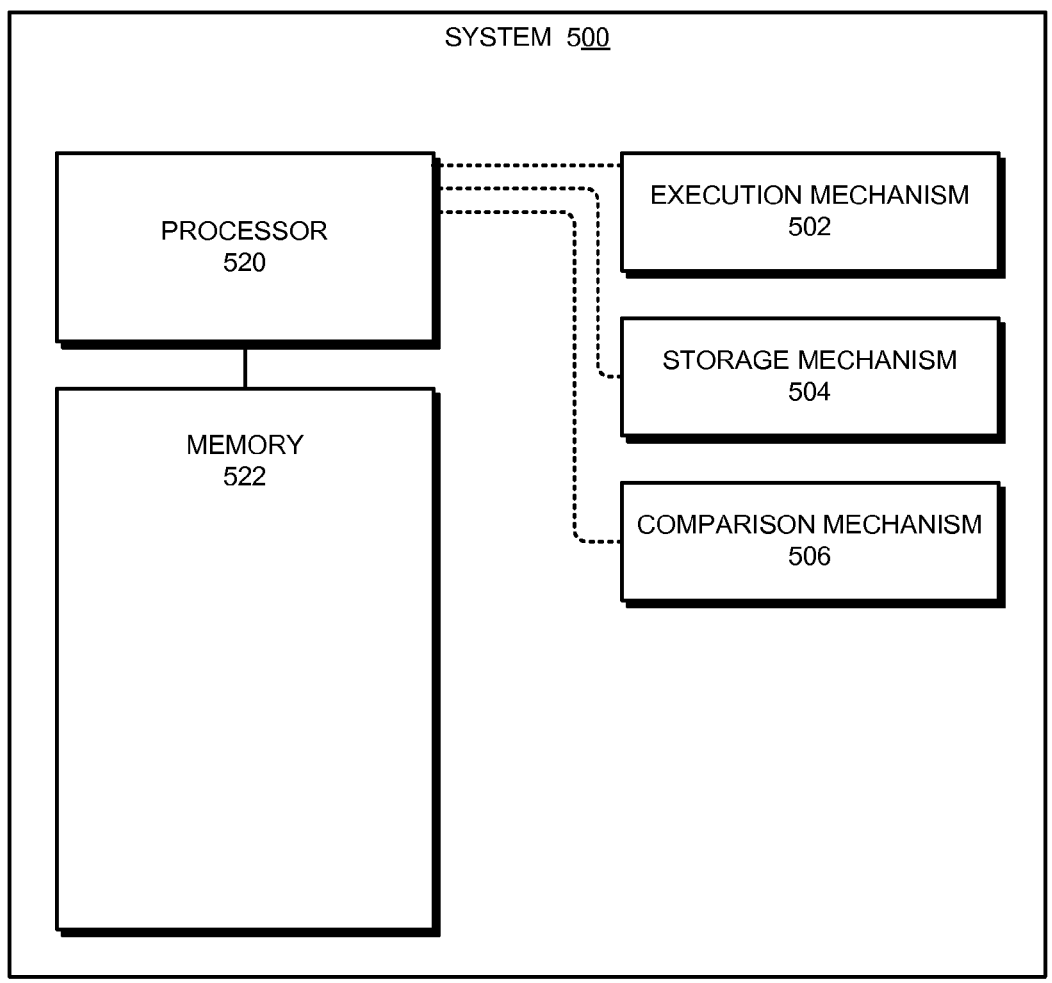
FIG. 5 illustrates a system in accordance with an embodiment.

FIG. 5 illustrates a system 500 that includes a processor 520, memory 522, execution mechanism 502, storage mechanism 504, and comparison mechanism 506. System 500 uses execution mechanism 502, storage mechanism 504, and comparison mechanism 506 to perform automated user-interface layout testing.

During operation, system 500 uses execution mechanism 502 to execute a pre-defined set of operations for a program. After these operations have executed, storage mechanism 504 then stores a representation (e.g., a snapshot) of the program user interface. Comparison mechanism 506 then compares this representation against a validated representation that was previously stored for the pre-defined set of operations to determine a difference between the representations. These mechanisms facilitate detecting changes to the program (and/or the environment in which the program executes) that affect the user interface that is presented to a user.

In some embodiments of the present invention, some or all aspects of execution mechanism 502, storage mechanism 504, and/or comparison mechanism 506 can be implemented as dedicated hardware modules in system 500. These hardware modules can include, but are not limited to, processor chips, application-specific integrated circuit (ASIC) chips, field-programmable gate arrays (FPGAs), memory chips, and other programmable-logic devices now known or later developed.

Although FIG. 5 illustrates execution mechanism 502, storage mechanism 504, and comparison mechanism 506 as being external to processor 520, in alternative embodiments some or all of these mechanisms can be included in processor 520. For example, processor 520 can include one or more specialized circuits for performing the operations of the mechanisms. Alternatively, some or all of the operations of execution mechanism 502, storage mechanism 504, and/or comparison mechanism 506 may be performed using general-purpose circuits in processor 520 that are configured using processor instructions.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for performing automated user-interface layout testing, the method comprising:
executing a pre-defined set of operations for a program;
storing a first representation of a user interface for the program subsequent to executing the operations;
automatically tagging the first representation with a unique tag, wherein the tag identifies an environment, workflow, and time frame in which the first representation is obtained, which allows identification of multiple images of the same workflow for comparison;
automatically selecting, based on the unique tag, one or more previously stored valid representations tagged with the same workflow for comparison with the first representation; and
comparing the first representation against each of the one or more validated representations to determine a difference between the representations, thereby facilitating detecting changes that affect the user interface, wherein said comparing involves:
receiving a specification that describes an acceptable level of change between the first representation and a validated representation;
and
determining whether the difference between the first representation and any of the one or more validated representations exceeds the acceptable level of change.

2. The computer-implemented method of claim 1, wherein the method involves determining whether the difference between the first representation and any of the one or more validated representations will be noticeable to a user.

3. The computer-implemented method of claim 1, wherein comparing the first representation against each of the one or more validated representations further involves:
receiving a specification for a region of interest in the first representation and the validated representation; and
comparing only the region of interest in the first representation with a corresponding region of interest in the validated representation.

4. The computer-implemented method of claim 3, wherein determining the difference involves performing a per-pixel comparison of the first representation and the validated representation to determine the difference between the representations.

5. The computer-implemented method of claim 1, wherein the method further involves notifying a quality assurance tester upon determining the difference between the representations.

6. The computer-implemented method of claim 5, wherein notifying the quality assurance tester involves one or more of the following:
providing the first representation and the one or more validated representations to the quality assurance tester;
highlighting pixels in the first representation that differ from pixels in any of the plurality of validated representations; and
receiving an indication from the quality assurance tester that indicates that the first representation is visually substantially similar to each of the one or more validated representations.

7. The computer-implemented method of claim 6, wherein the method further involves comparing multiple representations associated with different operations during program development and testing to ensure that the user interface presented to the user remains consistent across changes to the program and execution environment.

8. A non-transitory computer-readable storage medium storing instructions that when executed by a computer cause the computer to perform a method for performing automated user-interface layout testing, the method comprising:
executing a pre-defined set of operations for a program;
storing a first representation of a user interface for the program subsequent to executing the operations;
automatically tagging the first representation with a unique tag, wherein the tag identifies an environment, workflow, and time frame in which the first representation is obtained, which allows identification of multiple images of the same workflow for comparison;

automatically selecting, based on the unique tag, one or more previously stored valid representations tagged with the same workflow for comparison with the first representation; and comparing the first representation against each of the one or more validated representations to determine a difference between the representations, thereby facilitating detecting changes that affect the user interface, wherein said comparing involves:

receiving a specification that describes an acceptable level of change between the first representation and a validated representation; and determining whether the difference between the first representation and any of the one or more validated representations exceeds the acceptable level of change.

9. The non-transitory computer-readable storage medium of claim 8, wherein the method involves determining whether the difference between the first representation and any of the one or more validated representations will be noticeable to a user.

10. The non-transitory computer-readable storage medium of claim 8, wherein comparing the first representation against each of the one or more validated representations further involves:

receiving a specification for a region of interest in the first representation and the validated representation; and comparing only the region of interest in the first representation with a corresponding region of interest in the validated representation.

11. The non-transitory computer-readable storage medium of claim 10, wherein determining the difference involves performing a per-pixel comparison of the first representation and the validated representation to determine the difference between the representations.

12. The non-transitory computer-readable storage medium of claim 8, wherein the method further involves notifying a quality assurance tester upon determining the difference between the representations.

13. The non-transitory computer-readable storage medium of claim 12, wherein notifying the quality assurance tester involves one or more of the following:

providing the first representation and the one or more validated representations to the quality assurance tester;

highlighting pixels in the first representation that differ from pixels in any of the one or more validated representations; and receiving an indication from the quality assurance tester that indicates that the first representation is visually substantially similar to each of the one or more validated representations.

14. The non-transitory computer-readable storage medium of claim 13, wherein the method further involves comparing multiple representations associated with different operations during program development and testing to ensure that the user interface presented to the user remains consistent across program changes.

15. An apparatus configured for performing automated user-interface layout testing, comprising:

a processor;

a memory;

an execution mechanism configured to execute a pre-defined set of operations for a program;

a storage mechanism configured to store a first representation of a user interface for the program subsequent to executing the operations;

an association mechanism configured to automatically tag the first representation with a unique tag, wherein the tag identifies the first representation with a unique tag, wherein the tag identifies an environment, workflow, and time frame in which the first representation is obtained, which allows identification of multiple images of the same workflow for comparison;

a selection mechanism configured to automatically select, based on the unique tag, one or more previously stored valid representations tagged with the same workflow for comparison with the first representation; and a comparison mechanism configured to compare the first representation against each of the one or more validated representations to determine a difference between the representations, thereby facilitating detecting changes that affect the user interface, wherein said comparing involves:

receiving a specification that describes an acceptable level of change between the first representation and a validated representation; and determining whether the difference between the first representation and any of the one or more validated representations exceeds the acceptable level of change.

16. The apparatus of claim 15, wherein the comparison mechanism is further configured to:

receive a specification for a region of interest in the first representation and the validated representation; and compare only the region of interest in the first representation with a corresponding region of interest in the validated representation.

* * * * *